United States Patent
Pate et al.

(10) Patent No.: US 7,460,179 B2
(45) Date of Patent: Dec. 2, 2008

(54) ADAPTIVE IMAGE DISPLAY

(75) Inventors: Michael A Pate, Corvallis, OR (US); William J. Allen, Corvallis, OR (US); Brian S Dixon, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

(21) Appl. No.: 10/388,688

(22) Filed: Mar. 14, 2003

(65) Prior Publication Data

US 2004/0008288 A1    Jan. 15, 2004

Related U.S. Application Data

(63) Continuation-in-part of application No. 10/103,394, filed on Mar. 20, 2002, now Pat. No. 7,019,736, and a continuation-in-part of application No. 10/062,644, filed on Jan. 31, 2002, now Pat. No. 7,050,120.

(51) Int. Cl.
H04N 17/00 (2006.01)
H04N 17/02 (2006.01)
H04N 5/57 (2006.01)
H04N 5/58 (2006.01)
H04N 9/12 (2006.01)
H04N 9/73 (2006.01)
H04N 9/31 (2006.01)
H04N 5/64 (2006.01)

(52) U.S. Cl. .................. 348/602; 348/603; 348/742; 348/657; 348/744; 348/177; 348/191; 348/189

(58) Field of Classification Search ......... 348/602–603, 348/742–743, 177, 179, 191, 657; 345/590
See application file for complete search history.

(56) References Cited

U.S. PATENT DOCUMENTS

| | | | |
|---|---|---|---|
| 4,966,441 A | | 10/1990 | Conner |
| 5,136,390 A | * | 8/1992 | Inova et al. .................. 348/383 |
| 5,138,304 A | | 8/1992 | Bronson |
| 5,298,985 A | * | 3/1994 | Tsujihara et al. ............ 348/745 |
| 5,455,647 A | * | 10/1995 | Fujiwara ..................... 353/101 |
| 5,504,501 A | | 4/1996 | Hauck et al. |
| 5,532,764 A | * | 7/1996 | Itaki ........................... 348/745 |
| 5,532,765 A | * | 7/1996 | Inoue et al. .................. 348/807 |

(Continued)

FOREIGN PATENT DOCUMENTS

EP    1 111 578 A    6/2001

(Continued)

OTHER PUBLICATIONS

European Search Report for Application No. EP 03 25 5752. Report issued Mar. 1, 2007.

*Primary Examiner*—Brian P. Yenke

(57) ABSTRACT

A display system may include an identifier configured to identify an image display condition associated with the display of an image produced by the display system, an apparatus configured to produce a plurality of differently colored images, and a display device. The images have color characteristics based on image information and the identified display condition. Differently colored images may be directed along associated portions of an optical path. The display device may be coupled to the apparatus and may be configured to display a color image formed of the differently colored images.

57 Claims, 9 Drawing Sheets

U.S. PATENT DOCUMENTS

| | | | |
|---|---|---|---|
| 5,589,852 A | 12/1996 | Thompson et al. | |
| 5,650,832 A | 7/1997 | Poradish et al. | |
| 5,668,572 A | 9/1997 | Meyer et al. | |
| 5,680,180 A | 10/1997 | Huang | |
| 5,717,422 A | 2/1998 | Fergason | |
| 5,731,823 A | 3/1998 | Miller et al. | |
| 5,917,558 A | 6/1999 | Stanton | |
| 5,934,778 A | 8/1999 | Shioya | |
| 5,971,545 A | 10/1999 | Haitz | |
| 6,054,832 A | 4/2000 | Kunzman et al. | |
| 6,061,102 A * | 5/2000 | Sheppard et al. | 348/745 |
| 6,224,216 B1 | 5/2001 | Parker et al. | |
| 6,231,190 B1 | 5/2001 | Dewald | |
| 6,340,976 B1 | 1/2002 | Oguchi et al. | |
| 6,392,717 B1 | 5/2002 | Kunzman | |
| 6,406,148 B1 | 6/2002 | Marshall et al. | |
| 6,453,066 B1 | 9/2002 | Shiraiwa et al. | |
| 6,459,425 B1 | 10/2002 | Holub et al. | |
| 6,481,851 B1 | 11/2002 | McNelley et al. | |
| 6,483,537 B1 * | 11/2002 | Mayer et al. | 348/180 |
| 6,538,705 B1 * | 3/2003 | Higurashi et al. | 348/745 |
| 6,567,543 B1 * | 5/2003 | Shiraiwa et al. | 382/167 |
| 6,636,274 B1 * | 10/2003 | Mazda et al. | 348/745 |
| 6,674,436 B1 * | 1/2004 | Dresevic et al. | 345/472 |
| 6,726,333 B2 * | 4/2004 | Huibers et al. | 353/84 |
| 6,873,339 B2 * | 3/2005 | Ohsawa et al. | 345/604 |
| 6,958,785 B2 * | 10/2005 | Orfitelli et al. | 348/745 |
| 7,019,736 B2 * | 3/2006 | Allen et al. | 345/207 |
| 7,019,792 B2 * | 3/2006 | Kimura | 348/744 |
| 2002/0024612 A1 * | 2/2002 | Gyoten | 348/383 |
| 2002/0041708 A1 | 4/2002 | Pettitt | |
| 2002/0051001 A1 | 5/2002 | Kanai | |
| 2002/0118341 A1 | 8/2002 | Asakawa | |
| 2003/0053003 A1 * | 3/2003 | Nishi et al. | 348/744 |
| 2003/0103162 A1 * | 6/2003 | Sano et al. | 348/383 |
| 2004/0066533 A1 * | 4/2004 | Nakajima | 358/1.15 |

FOREIGN PATENT DOCUMENTS

| | | |
|---|---|---|
| EP | 1 161 103 A | 12/2001 |
| JP | 63-311230 | 12/1988 |
| JP | 8-292752 | 11/1996 |
| WO | WO 02-03687 A | 1/2002 |

* cited by examiner

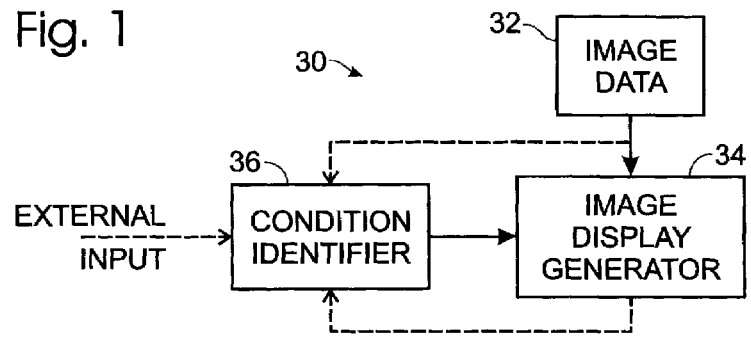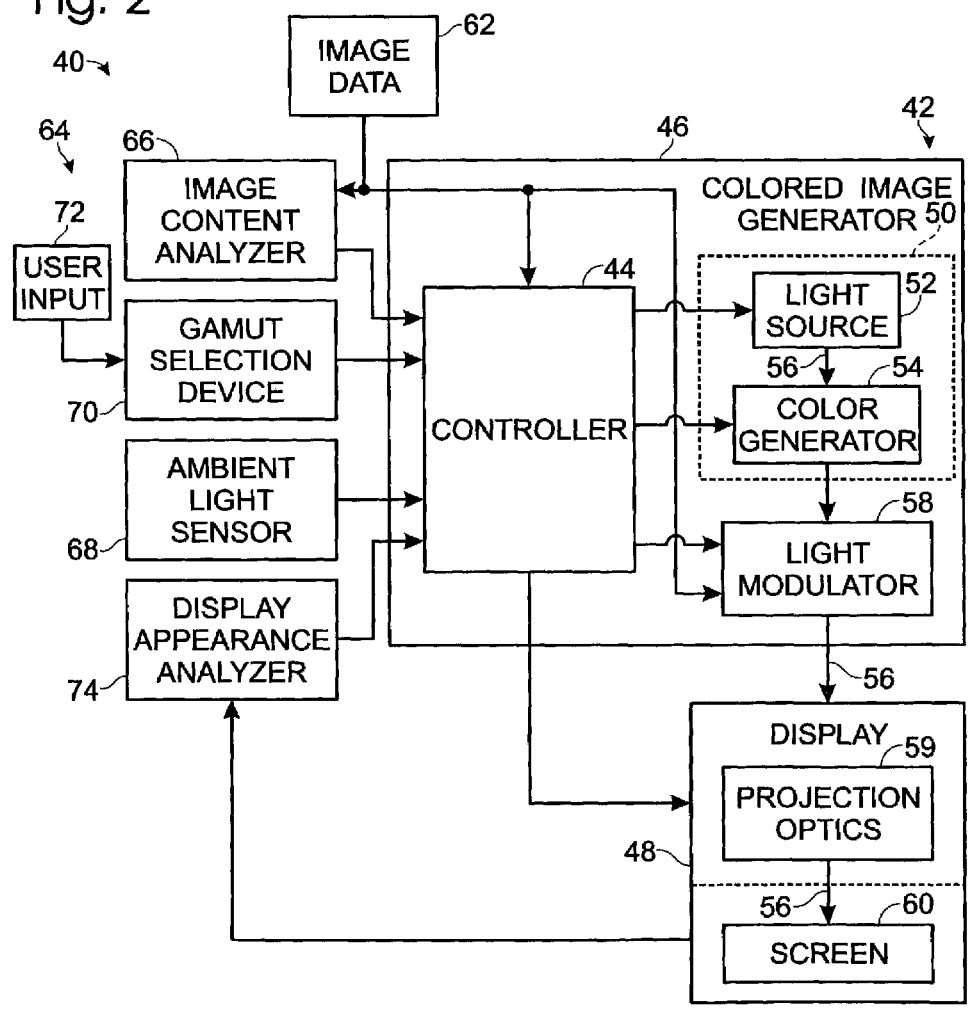

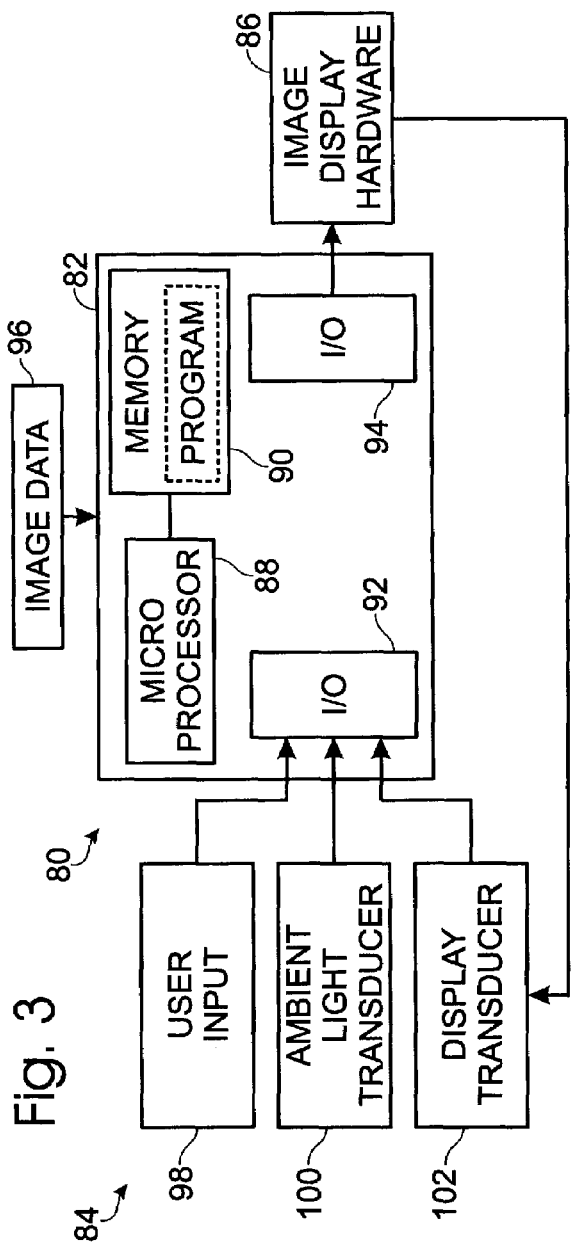

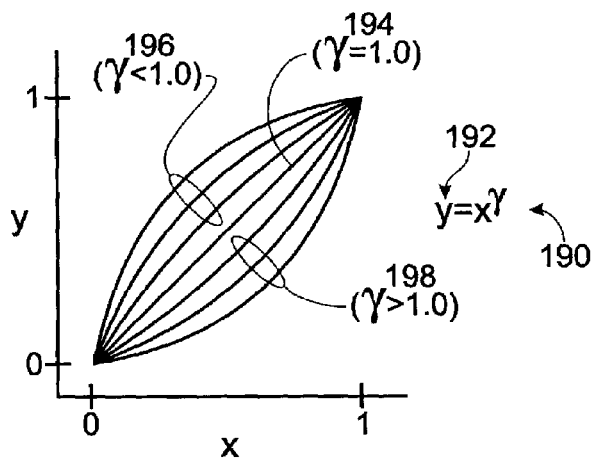
Fig. 8
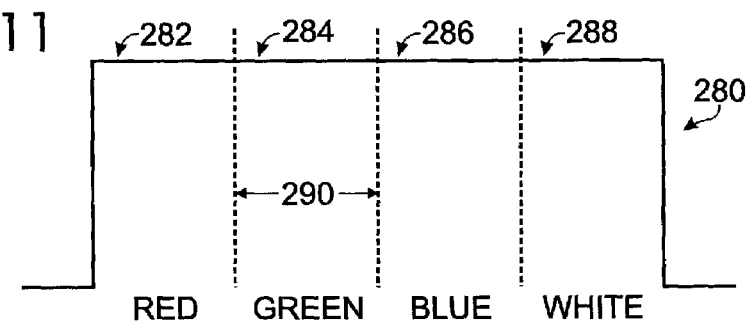
Fig. 9
$$R_N = C_{RR} \cdot R_O + C_{RG} \cdot G_O + C_{RB} \cdot B_O$$
$$G_N = C_{GR} \cdot R_O + C_{GG} \cdot G_O + C_{GB} \cdot B_O$$
$$B_N = C_{BR} \cdot R_O + C_{BG} \cdot G_O + C_{BB} \cdot B_O$$
$$\begin{bmatrix} R_O \\ G_O \\ B_O \end{bmatrix} \cdot \begin{bmatrix} C_{RR} & C_{RG} & C_{RB} \\ C_{GR} & C_{GG} & C_{GB} \\ C_{BR} & C_{BG} & C_{BB} \end{bmatrix} = \begin{bmatrix} R_N \\ G_N \\ B_N \end{bmatrix}$$
Fig. 11
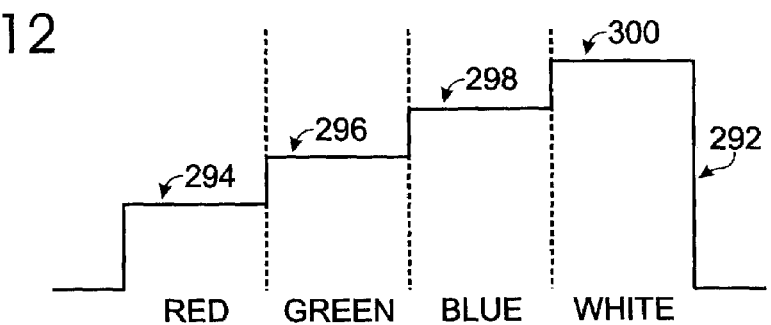
Fig. 12

RED  GREEN  BLUE  WHITE

RED  GREEN  BLUE  WHITE

RED  GREEN  BLUE  WHITE

RED  GREEN  BLUE  WHITE

452 RECEIVE IMAGE INFORMATION

454 IDENTIFY A DISPLAY CONDITION

456 PRODUCE A PLURALITY OF DIFFERENTLY COLORED IMAGES BASED ON THE IDENTIFIED DISPLAY CONDITION

458 DIRECT DIFFERENTLY COLORED IMAGES ALONG AN OPTICAL PATH

460 DISPLAY THE DIFFERENTLY COLORED IMAGES

ADAPTIVE IMAGE DISPLAY

CROSS-REFERENCE TO RELATED APPLICATIONS

This is a continuation in part of application Ser. No. 10/062,644, filed Jan. 31, 2002 now U.S. Pat. No. 7,050,120, and also a continuation in part of application Ser. No. 10/103,394, filed Mar. 20, 2002 now U.S. Pat. No. 7,019,736.

BACKGROUND

Various techniques for displaying images exist. One such approach is accomplished with the use of digital projectors. Typically, such projectors are configured to have a fixed gamut. In this context, gamut refers to the spectral power distribution of a range of colors, and includes specific color characteristics such as hue, saturation, and intensity or luminance. For such fixed-gamut projectors, it is typical to have a gamut that is either better suited for displaying graphical images, or one better suited for displaying video images. In this respect, a gamut for displaying graphical images may include more brightness (e.g. a higher intensity white point) at the expense of chroma, or color intensity. Conversely, a gamut for displaying video images may include more chroma at the expense of brightness.

Using a single fixed-gamut projector to display both graphical images and video images thus may result in a reduction in the quality of one type of image, or may result in a reduction of quality of both types of images. Therefore, multiple fixed-gamut projectors have sometimes been employed to achieve high-quality display of both still and video images. However, purchasing multiple fixed-gamut projectors is undesirable as such projectors may be expensive. Also, even with multiple fixed-gamut projectors, quality of mixed media images (e.g. graphical images and video images in the same presentation) may suffer.

SUMMARY

A display system may include an identifier configured to identify an image display condition associated with the display of an image produced by the display system, an apparatus configured to produce a plurality of differently colored images, and a display device. The images may have color characteristics based on image information and the identified display condition. Differently colored images may be directed along associated portions of an optical path. The display device may be coupled to the apparatus and may be configured to display a color image formed of the differently colored images.

BRIEF DESCRIPTION OF THE DRAWINGS

FIG. 1 is a block diagram showing a system for displaying images.

FIG. 2 is a block diagram showing an alternative system for displaying images.

FIG. 3 is a block diagram showing yet another system for displaying images.

FIG. 8 is a graph illustrating a non-linear, gamma correction function.

FIG. 9 is a diagram showing a linear matrix correction function.

FIG. 10 is a schematic view of a dynamic gamut display system.

FIG. 11 is a chart showing an example of energy applied to a light source of a display system.

FIG. 12 is a chart showing an example of the output of a color source that may be produced based upon the energy applied as shown in FIG. 11.

DETAILED DESCRIPTION

Figure 4:
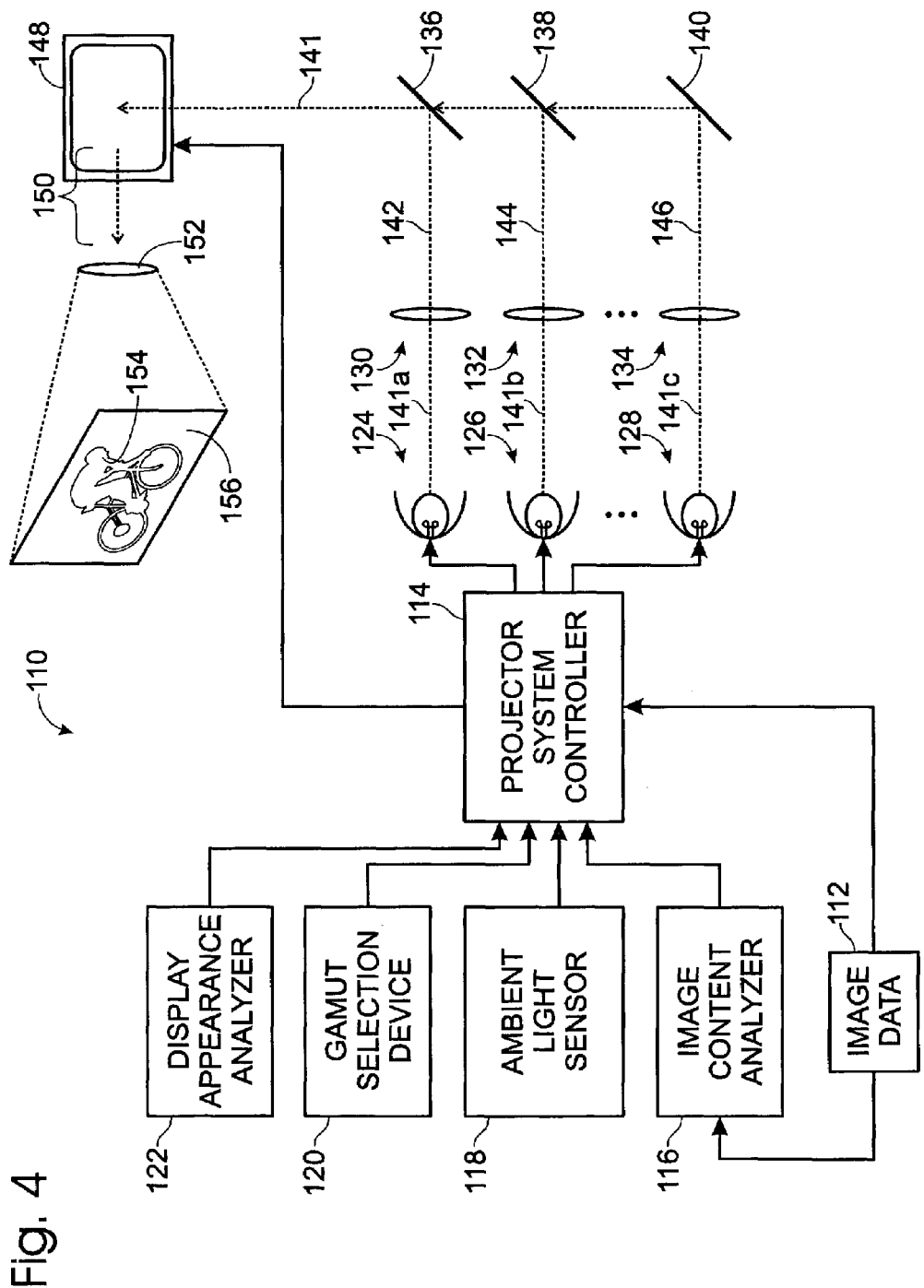
FIG. 4 is a schematic diagram showing yet another system for displaying images.

Referring initially to FIG. 1, a display system according to an embodiment of an invention is shown generally at 30. Display system 30 may be any suitable system adapted to display an image formed of differently colored images, including, but not limited to, rear-projection display systems, front-projection display systems, and projectors without a built-in screen or other display surface. Such display systems my employ overhead projectors, active liquid crystal display (LCD) projection devices, including liquid crystal on silicon display (LCOS), other spatial light modulators, and micromirror-based projection devices. The images projected or displayed may include still images, such as graphics, text, charts, and photographs, and video images, whether computer-generated, such as video games and animations, received as broadcasted television signals, or generated by a charge-coupled device (CCD), such as a video camera. Thus, the present disclosure is not limited to use with any particular type of image, or source of image data. The image data or information may be received from an image information or data source 32, over a corresponding data link, such as a graphics port, a universal serial bus (USB), an infrared connection, a super-video (S-video) port, component, composite, HDTV, or any communication link that communicates image information.

The image data may be communicated to an image display generator 34, which may function as means for producing a plurality of differently colored images. Display generator 34 may display the images or project the images for display. The display generator may include light sources, color generation devices or other color sources, colored image sources, optics, spatial light modulators, focusing devices, controllers or processors.

Differently colored images may be directed along associated portions of an optical path. The display device may then project for display or display a composite color image formed of the differently colored images. The composite image may be formed of one or more differently colored images and may be the image perceived by the viewer. The differently colored images may be projected along a common optical path or on separate optical paths, and may be projected sequentially or concurrently.

A condition identifier 36 may identify one or more conditions related to the display of an image by the display system. As such, it may provide means for identifying an image display condition. The condition may be identified by the system based on information received, such as external or user-input information, received data, such as image data or information, or information obtained by the system, such as ambient light conditions, or the appearance of a displayed image. The display system may generate the differently colored images for display, having optical characteristics based on the identified display condition. The condition identifier may include input/output devices, sensors, detectors, transducers, switches, selectors, analyzers, processors or controllers.

A display system 40, which may be an embodiment of the display system 30, is shown in FIG. 2. An image display generator 42 may include a processor or controller 44 coupled with a colored image generator 46 and a display device 48. The colored image generator may also be considered to be an image source, as well as an apparatus to produce different colored images. Colored image generator 46 may include a colored light source(s) or color source 50, that may include a light source 52 and a color generator 54.

The light source may be any suitable illumination source(s) adapted to optically produce and direct light along an optical path 56, including single white light sources, such as mercury, plasma, incandescent, laser and xenon lamps, or multiple white or single color light sources, such as, laser diodes, light emitting diodes (LEDs), arrays of LED's, or other solid state sources or arrays of sources. The light source may include optics for controlling, focusing and directing the light along the optical path. Additionally, the color source may include of one or more lamps or light-emitting devices, such as laser light sources, that emit colored light. The color generator may work on one or more of the following principles: interference, refraction, diffraction, absorption, reflection, or scatter. It may include items such as transmissive or reflective thin film interference filters, absorptive materials, refractive prisms, and diffractive optical surfaces that separate light into component colors or reduce portions of an available light spectrum.

Image generator 42 may include a light modulator 58 that modulates colored light received from color source 50. The image generator may also directly emit colored light coded as an image, such as is provided by LCD-based display systems. The modulator encodes the colored light, typically on a pixel-by-pixel basis, to produce colored modulated light directed along optical path 56.

Display device 48 directs the modulated light along the optical path for display. It may include lenses and other optical devices 59 that provide for focusing on a screen or other display surface 60. Alternatively, the colored images may be directed for focusing and viewing on a user-provided display surface.

The light source(s), color generator, color source, light modulator, colored image generator, or image display generator may each variously include a processor or controller adapted to control the operation of the associated device, or a separate controller 44, as shown, may be used. The controller may be configured to receive image information from an image data source 62 as well as an identified display condition received from a condition identifier shown generally at 64. The image data may be converted into commands appropriate for driving the various associated components of the display system.

Condition identifier 64 may identify a display condition that relates to an image displayed, presently or at another time, by the display system, including a condition that is provided by a user or that affects how a user perceives an image. In this context, display conditions may include image type, image content, image source, appearance of the displayed image, user preference, or ambient light conditions. The term ambient light conditions refers not only to the brightness or color mix of the directly applied light, but to any source of light that a user perceives. Thus, it also includes perceived light emitted or reflected from the room and its contents, and the visual response to it, which also may be referred to as the surround. Any factor, information or condition that may be identified and related to the image produced may be identified. For example, condition identifier 64 may include an image content analyzer 66, an ambient light sensor 68, a gamut selection device 70 configured to receive a user, or other external input 72, such as provided by a keypad, and a display appearance analyzer 74, all of which may be coupled with controller 44. It will be appreciated that these features are exemplary, and the disclosure is not limited to the use of these particular techniques for determining, establishing, or otherwise identifying one or more image display conditions.

Display systems according to the disclosure may have many different forms. For example, a display system 80 as illustrated in FIG. 3 may include a computer 82 coupled with one or more input devices, shown generally at 84, and image display hardware 86. Hardware 86 may correspond to the hardware associated with an image display generator 34 or 42. The computer may include a micro-processor 88, a memory 90 for storing data and a computer program for operating the system and processing the data, and respective input/output devices 92 and 94. As is well known, computers and processors generally may have any of a wide variety of structures or architectures. For instance, one processor may be used, as is illustrated. This processor may include functions related to a condition identifier as well as an image display generator. Alternatively, it may be divided into separate processors, memories and input/output devices associated with associated operative functions or hardware components.

Further, methods and processes described in this document may be computer driven, and corresponding algorithms may be programmed on such processors, which may be in the form of an ASIC. An algorithm may be generally conceived to be a self-consistent set of related steps leading to a desired result.

When stored, the algorithms may be stored in any computer-readable medium. Accordingly, these methods and processes are not inherently related to any particular computer or other apparatus for performing the operations. The processor may be a general purpose machine or a machine specially constructed for the stated purpose. When comprised of separate machines, the separate machines may be directly connected or connected by a network, such as a local or wide area network.

In the example shown in FIG. 3, many of the condition identifying functions may be provided by computer 82, such as image content analysis performed on image information received from an image data source 96. External devices, shown generally at 84, may provide unprocessed, processed or partially processed data. For instance, a user input device 98, such as a key or switch, may be used to input a user's gamut selection. An ambient light sensor or transducer 100 may provide analog or digital information of an identified ambient light condition. A display transducer 102, such as a charge-coupled device, may provide data on a displayed image. These devices may be attached to a housing for the computer or may be integrated into or on the image display hardware 86, such as may be appropriate for a display transducer that receives information from a displayed image. They may also be separate from it and connected by a suitable communication link, as has been discussed.

Another embodiment, shown as a display system 110, is illustrated in FIG. 4. As may be seen in the figure, image data 112 may be communicated to a system controller 114, which as has been discussed, may take the form of a microprocessor, micro-controller, ASIC, etc.

Various techniques for communicating image data 112 exist. For example, image data 112 may be communicated to controller 114 via a graphics port, a universal serial bus (USB), an infrared connection, a super-video (S-video) port, or any of various communication links. Image data 112 may be directly communicated to controller 114, and thus may be termed raw image data.

System 110 may be configured to display images based on image display conditions. In this context, display condition refers to a condition, factor, feature or characteristic of an image, and may include, for example, image type, image content, image source, appearance of the displayed image, user preference and/or ambient light conditions. System 110 thus may include an image content analyzer 116, an ambient light sensor 118, a gamut selection device 120 and a display appearance analyzer 122, coupled with controller 114. It will be appreciated that these features are exemplary, and the disclosure is not limited to the use of these particular techniques for determining and/or establishing display conditions.

For system 110, controller 114 is further coupled with light sources 124, 126 and 128. As is indicated in FIG. 4, the number of light sources may vary. For purposes of this discussion, system 110 will be described as being configured with a red light source 124, a green light source 126 and a blue light source 128. It will be appreciated that additional colors may be used, such as white, cyan, yellow and/or magenta, among others. It will also be appreciated that any of these colored light sources may correspond, respectively, to any of light sources 124, 126 and 128, or an array of sources.

In this respect, light sources 124, 126 and 128, in turn, may be optically coupled, respectively, with optical elements 130, 132 and 134 and beam combiners 136, 138 and 140 along respective portions 141a, 141b, 141c of an optical path 141. In this regard, light 142, 144 and 146 from light sources 124, 126 and 128 is directed by respective optical elements 130, 132 and 134 through beam combiners 136, 138 and 140 to a spatial light modulator (SLM) 148. SLM 148 is typically coupled with controller 114 so as to cooperate in selectively directing light 150, through an optical element 152. Light 150 may include a to-be-displayed image 154, which corresponds with image data 112. As is shown in FIG. 4, image 154 may be displayed on a screen 156. SLM 148 may be a digital micromirror device (DMD), LCD, LCOS, or any other mechanism capable of selectively directing light to display image 154.

As will be appreciated, SLM 148 may be configured to direct light 141 towards lens 152 on a pixel-by-pixel basis to form light 150, which may include image 154. Thus, as is discussed further below, controller 114 may sequence light sources 124, 126 and 128 and may control SLM 148 so as to cooperate, in the foregoing described fashion, to display image 154 on screen 156 on a pixel by pixel basis.

For system 110, image content analyzer 116 may be configured to receive image data 112, in order to examine the image data to formulate image content information. Image content analyzer 116 may then communicate the image content information to controller 114. Such image content information may, for example, include one or more of (a) the number of unique colors included in the image data, (b) the frequency, or a histogram, of unique colors, (c) pixel intensity, such as an average pixel intensity of the image data, and (d) changes in image data from one display frame to the next.

Image content may be determined in a number of ways. By way of example, image content may be determined as a result of the source of the image content. In this regard, an image is communicated to display system 110 through a video graphics array (VGA) input port (not shown), this may indicate that the image is a graphical image such as a still photograph or graph, and a high-brightness gamut may be selected. Alternatively, an image communicated to display system 110 through a super-video (S-video) port (not shown), may indicate that the image is a video image such as broadcast television or video game, and a high-chroma gamut may be selected. In another example, image content itself may be examined to determine if video or graphical images are to be displayed. As will be appreciated, image content analyzer 116 may be implemented, for example, as machine-readable instructions included in a software program or may be implemented using pipeline processing.

Ambient light sensor 118 may also be coupled with controller 114. Sensor 118 may be configured to detect ambient light in an environment where system 110 is being used to display images. In this regard, sensor 118 may be a charge-coupled device (CCD) sensor, or any other sensor capable of detecting light, including a photovoltaic device. Information regarding such ambient light character, such as hue, saturation, luminance, color temperature, chromaticity, and power spectral density may be communicated from sensor 118 to controller 114. In response to such ambient light information, controller 114 may modify the sequence of light sources 124, 126 and 128 and the operation of SLM 148 to adjust display of image 154. Such techniques are discussed in more detail below.

Gamut selection device 120 may also be coupled with controller 114. In this regard, gamut selection device 120 may be configured to provide for user selection of a display gamut. In this context, gamut refers to the spectral power distribution of a range of colors the device is capable of producing. Information communicated from gamut selection device 120 to controller 114 may result in the controller modifying the sequence of light sources 124, 126 and 128 and operation of SLM 148 when displaying image 154, such as increasing or reducing the amount of white light or one or more of the colored lights generated during a display frame. A higher setting on gamut selection device 120 may result in a brighter image 154 as opposed to a lower setting, or as compared to display of image 154 based solely on image data 112. Alternatively or additionally, gamut selection device 120 may alter the color temperature of the gamut, or some other attribute of the gamut. Techniques for modifying gamut based on information communicated from gamut selection device 120 are discussed further below. Other gamut altering techniques, such as are described with respect to other embodiments, including the selective use of filters or the variation in the energy applied to the light sources, may also be used.

Display appearance analyzer 122 may also be coupled with controller 114. Display appearance analyzer 122 may be configured to review display image 154 in order to formulate appearance information, such as the information obtained with regard to the raw image data. Such appearance information thus must be obtained by a CCD sensor or other device suitable for obtaining information about the displayed image may be communicated to controller 114 for use in improving the displayed image.

As was previously indicated, controller 114 may sequence light sources 124, 126 and 128 when displaying image 154. For instance the red, green and blue light sources may be turned on, or the light may be allowed to pass through a light valve for a selected duration once per display frame. Accordingly, timing pulses may be applied to the light sources. Red light source 124 may be turned on at the initiation of such a display frame. Red light source 124 may remain on for time duration $t_R$. Green light source 126 may then be turned on for time duration $t_G$, followed by blue light source 128 being turned on for time duration $t_B$. Time durations $t_R$, $t_G$ and $t_B$ may be approximately equivalent, non-overlapping time periods, though the disclosure is not so limited, and other timing relationships are possible. For example, if image 154 has a relatively low red content relative to its green and/or blue content, red light source 124 may be on for a shorter period of time than green light source 126 or blue light source 128 during a given display frame. Alternatively, if the red light source has a lower luminance than the other light sources, it may be on for a longer period of time.

It will be appreciated that although a frame width of 1/60 second is used as an example here, the display system may provide for variation in frame width from one frame to another, for example, due to variations in the image data. This typically would result in proportional changes in the time durations of the different light sources.

The three light sources, one source, or three RGB arrays of sources may also be turned on or an aperture opened twice during a frame. This sequence may repeat for successive display frames. Such a sequence may reduce sequential color artifacts relative to the first example in which the light sources are on once during a frame. Sequential color artifacts, it will be appreciated, may include rainbow colored shadows that may trail moving objects in video images, or flickering that results from one color appearing brighter than another color.

Other timing sequences are possible, such as the colors appearing three or more times per second or the colors appearing with different frequencies, such as two green pulses for a red pulse. Also, nonuniform pulse widths may be used within a single frame, such as where a light source comes on three times a display frame with one of the three time periods being approximately half of the other two. The specific timing relationship may be based on display conditions such as gamut selection, ambient light, image content, and display appearance as were previously discussed. Controller 114 thus may modify the sequence of the light sources to implement an appropriate RGB timing relationship based on display conditions. In this respect, the time duration a light source is on in a given display frame may be based on display conditions. For example, if an image to be displayed has a relatively high red content, as compared to the image's green and blue content, red light source 124 may be on for a longer relative time during display of such an image.

Additionally, white light may be added to a frame when a higher brightness is desired, as compared to the brightness provided for only the individual component colors. Such a situation may include an environment where ambient light may detract from viewability of image 154 without increasing the brightness. White light may be provided by a white light source. When only component colors are used, white light is provided by concurrently combining light of the component colors. In the example shown, white light may be produced during a time period $t_W$, as the sum of red, green and blue light. This situation may increase the brightness of image 154 when displayed.

Yet another alternative is the addition of yellow light to an image. In this example, red light source 124 and green light source 126 may be on simultaneously for a time $t_Y$, so as to produce yellow light, the sum of red and green light. It will be appreciated, that in this particular situation, green light source 126 may be on individually (producing green light) for a relatively shorter duration of time than red light source 124 or blue light source 128 during the frame. Such a situation may be beneficial where an image being displayed has a high yellow content. In other words, display system 110 may modify the gamut produced for displaying images frame by frame, based on display conditions, as were previously described. It will be appreciated, of course, that the color sequences described in any of the aforementioned examples may be repeated one or more times during a frame.

Figure 5:
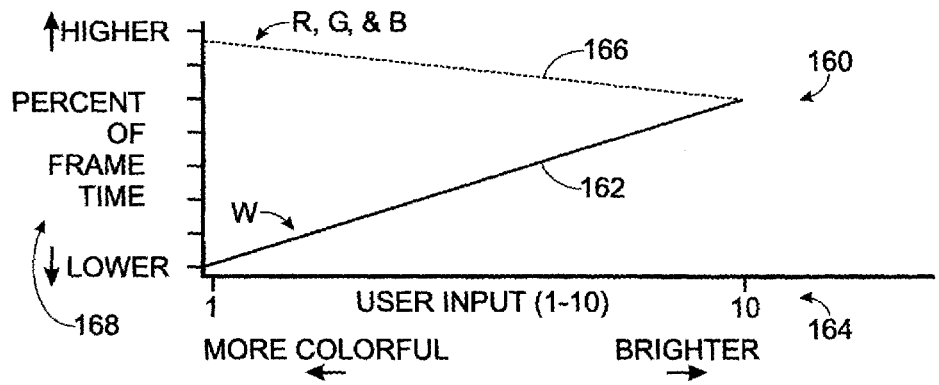
FIG. 5 is a graph showing a relationship of brightness to chroma that may be used to display images based on a user preference.

Referring now to FIG. 5, with further reference to FIG. 4, a graph showing an exemplary relative timing relationship based on an input signal to controller 114 from gamut selection device 120 for displaying image 154 is shown generally at 160. For graph 160, the x-axis represents a continuous range of gamut selection values. It could also correspond to an identified ambient light, displayed image, or image content condition, or image source type. The y-axis of graph 160 represents the percent of frame time the different types of light are produced in a given display frame. For this embodiment; red, green and blue light may be generated for equivalent time durations, or percentages of a given display frame.

The percent of time that white light is produced during a given display frame with respect to red, green and blue light, as indicated by line 162, varies linearly with the value given the identified condition, which in this example is referred to as a user input 164. In this respect, when user input 164 is 1, white light is not generated, or represents zero percent of the frame, while red, green and blue light are each generated for one-third (33.33%) of a given display frame. Comparing line 162 and line 166 of graph 160 demonstrates the relative percentage of frame time 168 that white light, red light, green light and blue light are generated for this embodiment. In this respect, a lower user input corresponds with a lower percentage of frame time 168 during which white light is generated.

As shown in FIG. 5, at the highest (10) user setting 164, the percent of frame time 168 during which white light is generated may be approximately the same as the percentages during which red, green and blue light is generated, or one-quarter (25%) of a given display frame. It will be appreciated that these relationships are exemplary and other percentages and timing relationships are possible. For example, the percent of frame time relationships may be nonlinear; red, green and blue light percentages may be varied individually; or further limits on percent of frame time during which white light is produced may be implemented.

Figure 6:
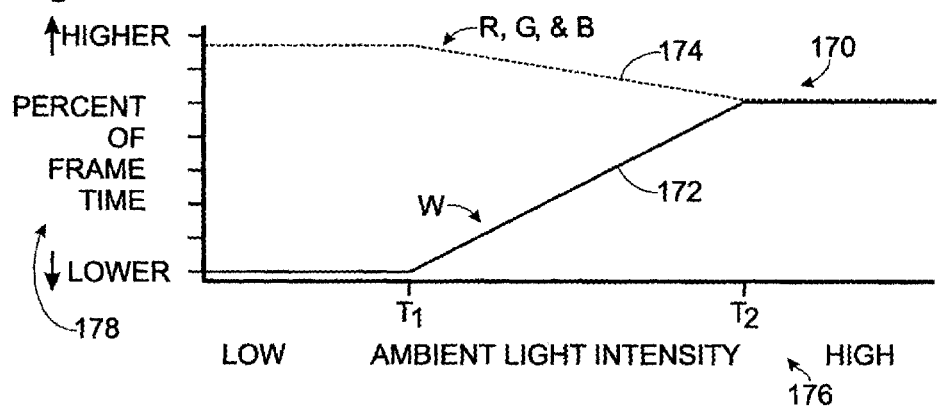
FIG. 6 is a graph showing a relationship of brightness to chroma that may be used to display images based on ambient light intensity.

Referring now to FIG. 6, a graph, indicated generally at 170, illustrates an exemplary timing relationship based on an ambient light character, such as intensity 176. In this respect, line 172 in FIG. 6 indicates a percentage of white light, relative to line 174, which indicates a percentage of red, green and blue light. At ambient light intensities below threshold T1, no white light is produced (0% of a given frame) while red, green and blue light are each produced for one-third (33.33%) of a given display frame.

As with FIG. 5, the relationship of percent of frame time 178 during which the different types of light are generated is demonstrated by comparing lines 172 and 174 in graph 170. As can be seen from graph 170, the percent of time that white light is generated during a given display frame with respect to red, green and blue light, may vary linearly as ambient light intensity varies between threshold T1 and threshold T2. At ambient light intensities at or above threshold T2, red, green, white and blue light may each be generated for one-quarter (25%) of a given display frame, as indicated by FIG. 6.

Figure 7:
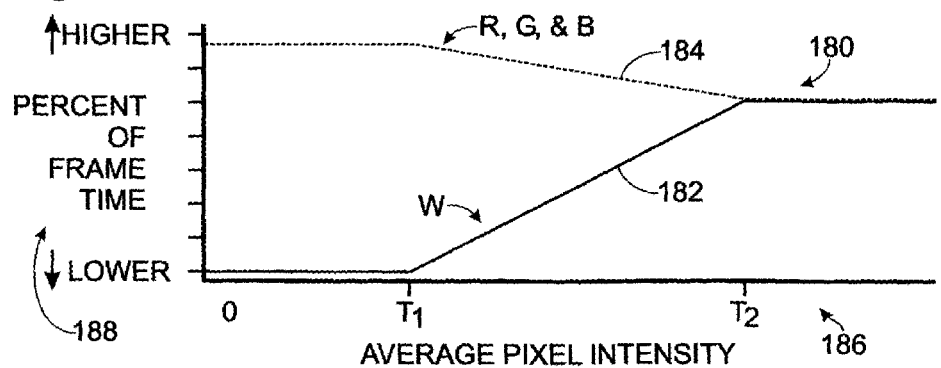
FIG. 7 is a graph showing a relationship of brightness to chroma that may be used to display images based on image content as determined by average pixel intensity.

Referring now to FIG. 7, a graph illustrating an exemplary timing relationship based on average pixel intensity is indicated generally at 180. In this respect, line 182 in FIG. 7 indicates a percentage of white light generated in a given display frame, relative to line 184, which indicates a percentage of red, green and blue light generated in that display frame. At lower average pixel intensities 186, below threshold T1, no white light (0% of the display frame) may be produced, while red, green and blue light may each be produced for one-third (33.33%) of the display frame.

As with FIGS. 5 and 6, the relationship of percent of frame time (188 in FIG. 7) during which the different types of light are generated is demonstrated by comparing lines 182 and 184 in graph 180. As can be seen from graph 180, the percent of time that white light is generated during a given display frame with respect to red, green and blue light, may vary linearly as average pixel intensity varies between threshold T1 and threshold T2. At average pixel intensities at or above threshold T2, red, green, white and blue light may each be generated for one-quarter (25%) of a given display frame, as indicated by FIG. 7. As with FIGS. 5 and 6, it will be appreciated that the relationships illustrated in FIG. 7 are exemplary and other percent of frame time 188 relationships may exist.

Image data 112 may be processed to reduce variation in display of an associated image across various display systems. In this respect, FIG. 8 is a graph showing a gamma correction relationship indicated generally at 190. Such a relationship may be used to modify image data to reduce the amount of variation in the appearance of an image from one type of display system to another. In this respect, the relationship shown in graph 190 is a family of curves for equation 192, $y=x^\gamma$. This relationship, with a specific value of $\gamma$ (gamma), may be applied to red, green and blue components of colors for an image to be displayed. Alternatively, correction with individual values of gamma may be applied to the individual components. In this respect, x may represent a nominal red intensity for a specific pixel in an input image. y would then typically represent the nominal gamma corrected red intensity of the projected pixel.

As may be seen in FIG. 8, line 194 corresponds to the situation where gamma is equal to one. In this case, gamma correction would not be made. As is also shown in FIG. 8, the group of curves indicated by 196 corresponds to correction factor relationships where gamma is less than one. Conversely the group of curves indicated by 198 corresponds to correction factor relationships where gamma is greater than one. Accordingly, data may be input into controller 114 indicating the value of gamma to apply to input image data for the given projector, or for a given set of changes made to the system gamut, such as due to the change of a filter in the optical path or the application of a correction factor applied based on an identified image display condition.

Each color may have a different gamma curve, and the curve may not be a smooth curve. Additionally, the slope may change signs one or more times. FIG. 9 illustrates a linear color matrixing relationship that is indicated generally at 200. Equations 202 represent linear relationships for accomplishing a conversion between a first set of red, green and blue components of an original color, $R_O$, $G_O$, and $B_O$, respectively. Correction factors may be applied to these color components to calculate a new red value. In this respect, "new-red" may be determined by applying a red-red color correction factor $C_{RR}$ to $R_O$, a red-green correction factor $C_{RG}$ to $G_O$, and a red-blue correction factor $C_{RB}$ to $B_O$. Likewise, similar correction factors, as are indicated in equations 202, may be applied to determine "new-green" $G_N$ and "new-blue" $B_N$.

Equations 202 may be implemented in a linear matrix relationship 204. In this respect, an "original" color vector 206 may be multiplied by a correction factor matrix 208, which may include the correction factors of equations 202, to produce a "new" color vector 210. It will be appreciated that image data may be modified via various correction factors, color matrices, exponential relationships and lookup tables. For example, not all correction factors may be applied in certain circumstances. The color matrixing relationship used may depend on, at least, display conditions, such as display appearance, the display system used to display the images, and image type. Look-up tables may preserve computational resources. Other factors exist, and the invention is not limited to these specific conditions.

FIG. 10 illustrates, at 220, a display system employing a color filter in the form of a single color wheel 222. As indicated, the depicted display system may further employ a light source 224 configured to direct light 226 along an optical path 228 toward color wheel 222. Examples of color wheels are described below with reference to FIGS. 17 and 21-23. In the depicted display system, light from the light source impinges on a separate condensing lens 230 and then on color wheel 222. Alternatively, a light source having an elliptical reflector with no lens 230 may also be used. An eliptical reflector has two foci, one at the fire ball and one at the integrating rod. It will be appreciated, however, that light source 224 may instead include optics such as lens 230. It also will be appreciated that light source 224 may take the form of a high-pressure mercury lamp, but the present disclosure is not so-limited.

Color wheel 222 may be mounted on a shaft 232 which, in turn, may be operated on by a motor or some other drive mechanism (not shown) capable of rotating the color wheel rapidly, typically on the order of several thousand revolutions per minute (rpm). Color wheel 222 defines three color regions, a red region, a green region, and a blue region, which pass through the optical path as the color wheel rotates so as to sequentially filter light from the light source.

As indicated, as it passes through the color wheel, incident light 226 is filtered, producing colored light 234. Reflective filters may also be used, in which case the light would reflect off of the color regions. With either embodiment, the optical path impinges the filter. Colored light 234 may then be passed through an integrator rod 236 that homogenizes the colored light and directs such homogenized colored light toward an illumination lens 238. Illumination lens 238, in turn, may direct the homogenized colored light onto a spatial light modulator (SLM) 240, such as a digital micro-mirror device, an LCD, an LCOS, a spatial light modulator, or a digital light processor. Use and operation of such SLMs is known, and will not be discussed in detail here. Spatial light modulator 240 converts the colored light from color wheel 222 into modulated colored light 242 comprising differently colored images. The colored light will be seen to pass through a projection lens 244, and then along optical axis 228 on to a display surface 246 for display of an image. A viewer 248 then views the displayed image also along the optical path.

Display system 220, as described to this point, may produce a displayed image having a gamut determined by the features of the system, such as the received image information, the spectral color distribution of the light source, the filter characteristics of the various filters in the color wheel, the optics, spatial light modulator, screen, and any processing performed on the image information. As has been discussed, based on image display information identified by an image display condition identifier 250, a controller 252 may change the gamut, also referred to as color balance or color characteristics, of the image in various ways, a few of which have been and will be described.

In the exemplary system shown in FIG. 10, controller 252 may change the gamut by inserting, removing or replacing one or more filters anywhere in optical path 228. In particular, system 220 may include a support 254 supporting a plurality of filters, such as filters 256 and 258. A carrier 260 under the control of controller 252, selects and places the filters in the optical path, as represented by filter 258, and in carrier 260, as represented by filter 256. None, one or more filters may be placed in the optical path, as is indicated by a filter 262 shown in dashed lines. These filters may have a variety of filtering characteristics to modify selectively the light spectrum in different ways. The gamut of an image is changed according to the combined effect of all filters moved into and out of the optical path.

It will be appreciated then that a variety of gamut changes may be obtained that corresponds to the different combinations of the various filters in the optical path. This capability may be achieved regardless of where in the optical path that the filters are placed. For instance, filters may be a part of the light source structure, as represented by dashed line 264. The filters may further be placed between functional structures in the optical path, as illustrated by dashed lines 266, 268 and 270. A further filter position could also be between screen 246 and viewer 248, as represented by dashed line 272. Additionally, any of the optical features, such as lenses or filter wheels, could include filtering coatings or elements, although this may require interchanging a plurality of such features in the optical path. Further, combinations of interchangeable filters dispersed at different filter stations along the optical path also may be provided.

Interchangeable filters may also be used in display systems in which the optical path has branches, such as system 110 illustrated in FIG. 4. When a filter is placed into or removed from a portion or branch of an optical path associated with a component color source, such as any of color sources 124, 126 and 128 shown in that figure, the effect of the filter change relates only to the effect of the light impinging the filter. The transmission characteristics of the respective filters are selected accordingly. Reflective filters may also be used.

Referring again to FIG. 10, light source 224 in combination with lens 230 and color wheel 222 comprise a color source 274. Color source 274 in combination with integrator rod 236, any adjustment filters, such as filter 258, lens 238 and spatial light modulator 240 form a colored image source 276. Light source 224, and correspondingly color source 274 and colored image source 276, may produce light having a saturation, intensity or luminance corresponding to the level of illuminating energy applied. Such energy may be applied by a power supply 278 that may be responsive to a control signal from controller 252 representative of a selected power level.

An example of one pattern of energy applied to light source 224 is illustrated by a graph 280 in FIG. 11. This graph is a plot of energy applied versus time. For simplicity, the level of energy is shown for an isolated, single frame only. This discussion may be applied to all frames or to select frames, as appropriate in a given application. A series of pulses 282, 284, 286 and 288 have a common level of energy applied, as represented by the constant horizontal line. In this example, these pulses may have corresponding durations, such as duration 290 and are associated with the production of red, green, blue and white light, as indicated, during a frame. The pulse durations correspond to the rotational angle for each filter. The filter angles may not be equal 90 degree segments each, but they will add up to 360 degrees, of course.

Figure 13:
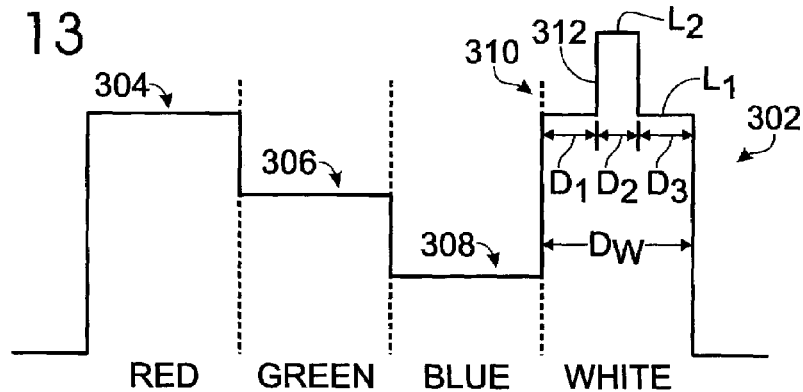
FIG. 13 is a chart showing an example of energy applied to a light source of a display system.

Given the application of energy of equal levels, color source 274 or colored image source 276 may produce light having the relative levels represented by waveform 292 in FIG. 12 formed of respective pulses 294, 296, 298 and 300. The results shown indicate that the effective saturation or luminance is lowest for red and progressively increases, with white having the highest luminance. By adjusting the level of energy applied to the light source for the different colors as well as the duration of each color, compensation can be provided for the variance in the light source from a uniform color distribution. The level of energy applied during the production of the different colors can further be adjusted to produce a desired gamut change. For instance, if a more uniform color distribution is desired as well as a brighter gamut, overall, the energy level sequence shown generally at 302 in FIG. 13 may be used. A pulse 304 of energy during the red period may be higher than that of a pulse 306 applied during the green period. The level of energy may be least during production of the blue color, as represented by a pulse 308.

A white pulse 310 having a total duration $D_W$ may be divided into component durations $D_1$, $D_2$ and $D_3$. The level $L_1$ applied during durations $D_1$ and $D_3$ may be substantially the same, while the level $L_2$ applied during duration $D_2$ may be higher or lower, as appropriate. A relatively narrow pulse of increased energy level, such as the pulse 312 represented by the level $L_2$ during duration $D_2$, may be useful for extending the life of certain light sources. By applying such a pulse during the white duration $D_W$ of a frame, it may be used to increase the luminance of a resulting image.

Figure 14:
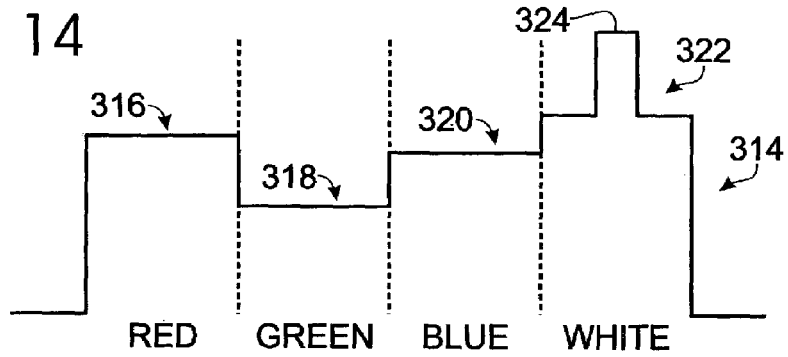
FIG. 14 is a chart showing an example of the output of a color source that may be produced based upon the energy applied as shown in FIG. 13.

The resulting color levels produced by a color source or colored image source may then be as shown by waveform 314 in FIG. 14. Waveform 314 includes respective red, green, blue and white pulses 316, 318, 320 and 322. White pulse 322 includes a narrow pulse 324 resulting from pulse 312. With such a result, the levels of intensity may increase from lowest to highest in the order green, blue, red and white. A composite image formed of colored images having these intensities may be viewed as having relatively even color luminance and the image overall would be relatively bright. For colors produced with substantially equal intensity, the human eye may perceive the green light to have the highest luminance and the red light the lowest luminance. In this case, by giving the green light the lowest intensity and red light the highest intensity, these colors tend to appear to have similar luminance.

Figure 15:
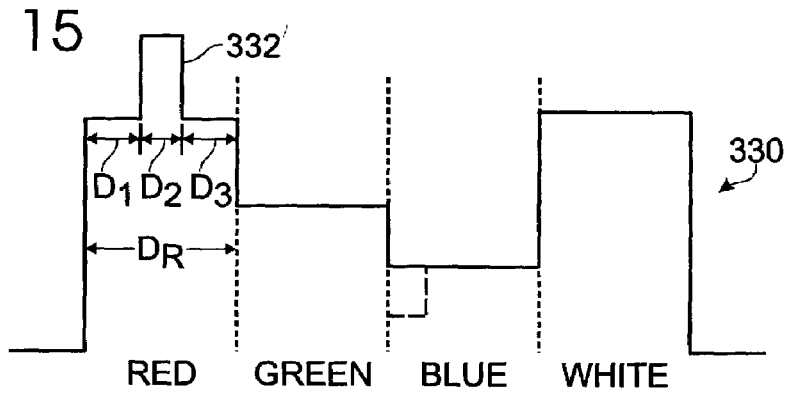
FIG. 15 is a chart showing another example of energy applied to a light source of a display system.
Figure 16:
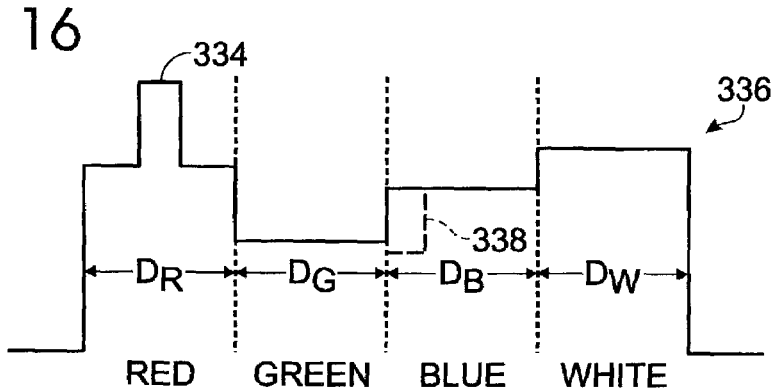
FIG. 16 is a chart showing an example of the output of a color source that may be produced based upon the energy applied as shown in FIG. 15.

The gamut of an image may thus be modified by changing the level of the energy applied to a light source during production of different colors. The gamut may also be changed by applying one or more positive or negative narrow pulses to one or more of the different colors. Additionally, a higher chroma gamut may be produced by reducing in time or energy level, or even by eliminating entirely, the white light duration. A further example of this is illustrated by waveform 330 in FIG. 15. FIG. 15 illustrates an example that may be similar to that shown in FIG. 13 except that a narrow pulse 332 of energy may be applied to the light source during the duration $D_R$ that the color red is produced. This may produce a color red having increased luminance or saturation, as illustrated by narrow pulse waveform 334 in FIG. 16. A color produced with a positive narrow pulse of energy may accordingly appear to have increased saturation or luminance. As represented by a narrow pulse 338, shown in dashed lines, occurring during the duration $D_B$ that blue is produced, a narrow pulse may have a reduced energy level, resulting in a reduced saturation or luminance for that color. Further, pulse 338 is shown to occur at the beginning of duration $D_B$. Such a pulse may occur any time in the overall duration during which a color is produced.

As has been discussed, display systems may be considered to have a fixed gamut. In this regard, only a single range of colors (gamut) may be produced by such systems. Since high-brightness gamuts may not be particularly well suited for displaying video images, and high-chroma gamuts may not be particularly well suited for displaying graphical images, consumers have sometimes purchased separate display systems to achieve the best quality for both types of images. However, such display systems may be expensive, making purchase of multiple display systems undesirable.

Figure 17:
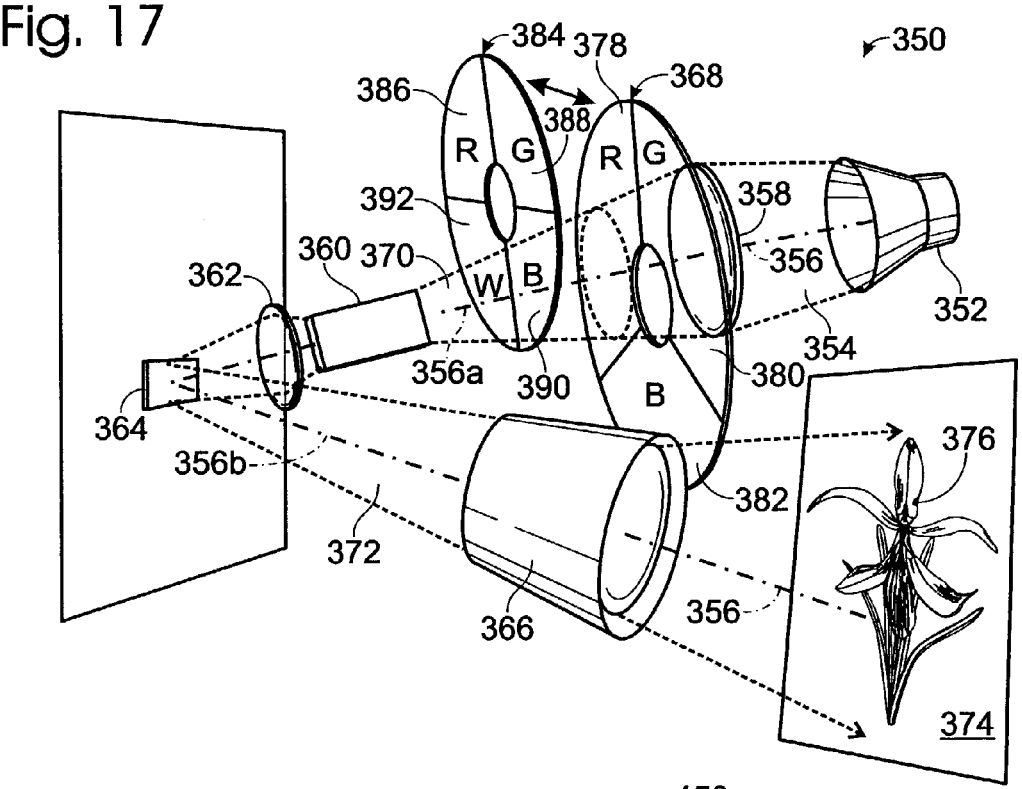
FIG. 17 is a somewhat schematic isometric view of a dynamic gamut display system.

Referring now to FIG. 17, a somewhat schematic isometric view of a dynamic gamut display system according to an embodiment of the present invention is indicated generally at 350. As indicated, display system 350 includes an illumination or light source 352 configured to produce and direct light 354 along an optical path 356 (indicated by the dash-dot line). Dynamic gamut display system 350 may further include a condensing lens 358, an integrator rod 360, an illumination lens 362, a spatial light modulator 364 and a projection lens 366.

Incident light 354 impinges a sequential color filter or color wheel 368 containing color filters, to produce colored light 370. The respective different colors are directed along a common associated portion 356a of optical path 356. Colored light 370, in turn, may pass through integration rod 360, which homogenizes the colored light and directs such homogenized colored light toward illumination lens 362. Illumination lens 362 may then direct the homogenized colored light onto spatial light modulator 364, which produces colored light 372 modulated to form differently colored images directed along associated optical path portion 356b. Modulated colored light 372 may then pass through projection lens 366, and then on to a display surface 374 to display an image such as that shown at 376.

As indicated, display system 350 includes first sequential color wheel 368, which may be of a high-chroma configuration. Color wheel 368 may define a red filter region 378, a green filter region 380 and a blue filter region 382. The depicted color wheel typically is used to produce video images due to its high relative chroma (color intensity and saturation). In this regard, color wheel 368 may be characterized as producing a "high-chroma gamut."

Display system 350 also includes a second sequential color wheel 384, which may be of a high-brightness configuration, producing a sequence of colors similar to that illustrated in FIGS. 11-16. Color wheel 384 thus may be seen to define a red region 386, a green region 388, a blue region 390 and a white region 392. White region 392 may be substantially clear so as to provide for passage of white light through it. Color wheel 384 typically may be used to produce graphical images due to its brighter white point relative to color wheel 368. Chroma, it will be appreciated, may be traded off for brightness in the gamut produced by color wheel 384 relative to color wheel 368. Thus, color wheel 384 may be characterized as producing a "higher-brightness gamut."

Each of color wheels 368 and 384 may be moved in to and out of the optical path so as to selectively cooperate in sequentially filtering light 354. Thus, display system 350 may produce a dynamic gamut, either a high-chroma gamut using color wheel 368 for displaying video images or a high-brightness gamut using color wheel 384 for displaying graphical images. The gamut thus may be selected based on image content. Similarly, the gamut may be selected based on physical environment (e.g. ambient lighting), user preferences, etc. Although first color wheel 368 and second color wheel 384 take the form of rotating wheels, other techniques of producing sequentially colored light or aligning color filters sequentially with the optical path may be provided. For instance, three colored light sources may be used, as has been described with reference to system 110 shown in FIG. 4. A display system such as system 350 may thus allow the display gamut to be changed based on the content of an image currently being displayed.

Figure 18:
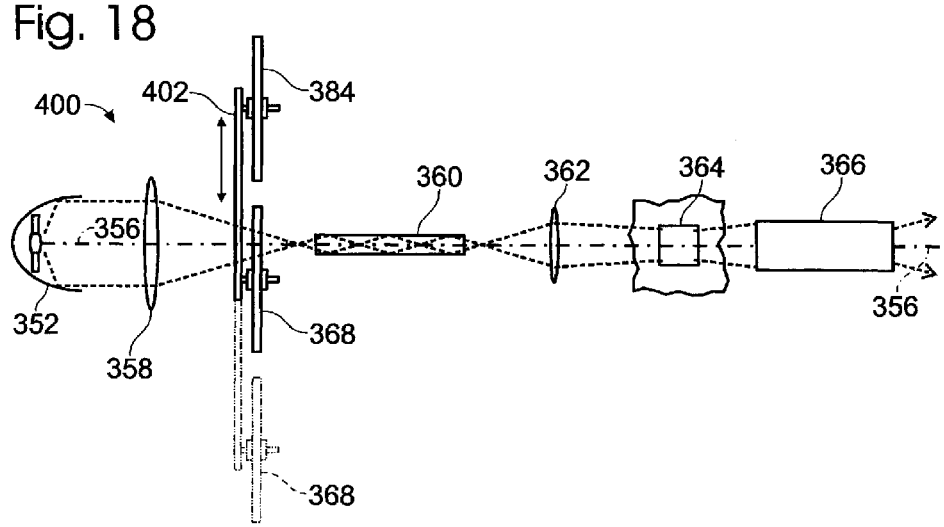
FIG. 18 is a somewhat schematic top view of an embodiment of the dynamic gamut display system shown in FIG. 17.
Figure 19:
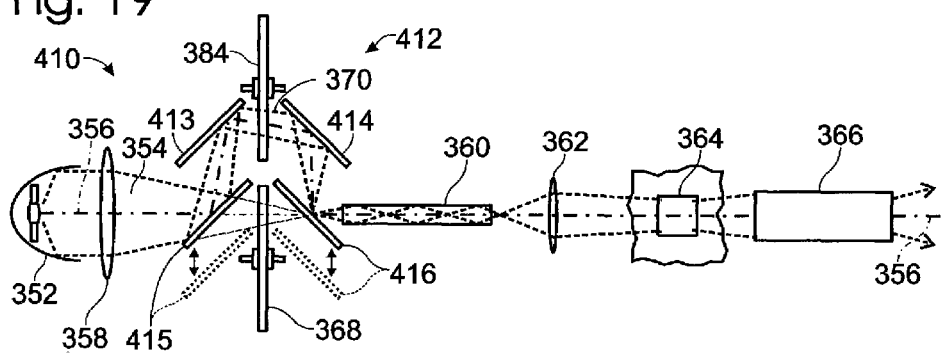
FIG. 19 is a schematic view of a dynamic gamut display system.
Figure 20:
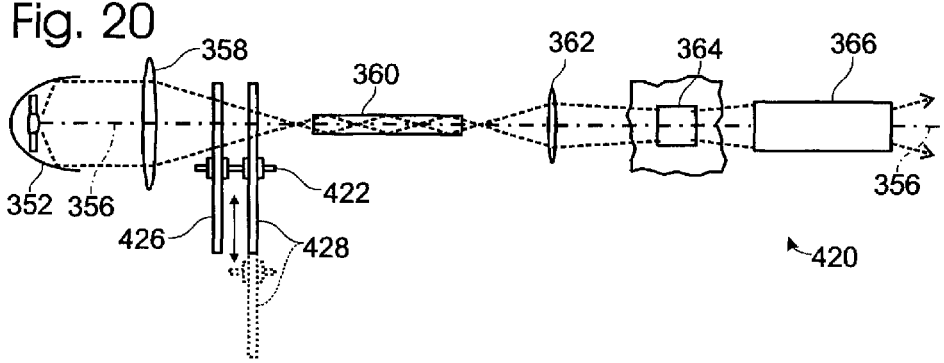
FIG. 20 is a schematic view of dynamic gamut display system.

FIGS. 18, 19 and 20 illustrate three display systems 400, 410 and 420, respectively, similar to system 350 shown in FIG. 17. Features that may be the same as those included in system 350 have the same reference numbers. These features include an illumination source 352, a condensing lens 358, sequential color wheels 368 and 384, an integrator rod 360, an illumination lens 362, a spatial light modulator 364, a projection lens 366, and light traveling along an optical path 356.

Referring now particularly to FIG. 18, display system 400 may include a carriage 402 on which color wheels 368 and 384 may be rotationally mounted. Carriage 402 may be configured to selectively place either color wheel 368 or color wheel 384 in optical path 356. Display system 400 thus provides for alternate placement of the two color wheels in the optical path. As will be seen, this may be accomplished by either moving the optical path, moving the color wheel, or both. As such, the display system of FIG. 18 is operable in two states with regard to color wheels. In one state the optical path passes through one color wheel, and thereby the filters contained on that color wheel. In the other state, the optical path passes through the other color wheel and thereby the filters contained on the other color wheel.

Carriage 402 may be manually controlled, or automatically controlled based on image content or other identified display condition, as previously described. Accordingly, color wheel 368 is shown disposed within the optical path along which light from illumination source 352 is directed. The same color wheel is shown in dot-dash lines as it may be disposed when carriage 402 is moved such that color wheel 384 is disposed in the optical path. Various techniques for aligning selectively color wheels 368 and 384 in the optical path exist. For example, a mechanical shuttle may be used or, alternatively, a rotational mechanism, or some other transport mechanism may be used.

Referring to FIG. 19, display system 410, as opposed to display system 400, may employ sequential color wheels 368, 384, which are mounted for rotation, at predetermined locations relative to illumination source 352. Accordingly, display system 410 may employ an optical path director 412 which selectively alters the optical path of light 354 from illumination source 352. This optical path director may include mirrors 413, 414, 415 and 416, which may themselves be moved in to or out of the optical path, as represented by mirrors 415 and 416 shown in dashed lines, so as to selectively direct light toward a desired one of the color wheels. Alternatively, prisms or other optical devices may be used.

For display system 410, incident light 354 from light source 352 may be conveyed through condensing lens 358. Mirror 415 may then alter the path 356 of light 354, directing it to color wheel 384, rather than through color wheel 368. Mirror 413 may then direct light 354 through color wheel 384 to produce colored light 370. Colored light 370 may then be directed, by mirror 414, to mirror 416, which may, in turn, direct the colored light to integrator rod 360. Upon removing mirrors 415 and 416 from the optical path, light may be directed through color wheel 368. The optical path of light from light source 352 thus may be selectively altered depending on the content of an image to be displayed (e.g. graphical or video image), as has been previously discussed.

FIG. 20 is a schematic view of dynamic gamut display system 420 according to yet another embodiment of the invention. Color wheels 426 and 428 may take the form of color wheels mounted within the display system such that the directed light passes through both color wheels in succession. The two color wheels may be controlled independently. Typically, a first one of the color wheels may be rotated while the other color wheel is maintained in a fixed position. In the present embodiment, where the color filters are color wheels, the color wheels are coaxially rotationally mounted on an axle 422. Alternatively, the color wheels may be configured such that the color wheels rotate together in a fixed angular orientation with respect to each other. Further, color wheel 426 may be fixed in optical path 356 and color wheel 428 may be selectively removable from the optical path, as illustrated by color wheel 428 in dashed lines.

Various configurations of color regions may be used on color wheels 426 and 428. For instance, a color wheel may define four color regions of generally equivalent size, a red region, a green region, a blue region and a white region as illustrated for color wheel 384 in FIG. 17. The white region may be made smaller than the other regions, or the regions may have different sizes. One color wheel may remain stationary while the other rotates. That is, incident light thus may pass through a white region of one color wheel, and sequentially pass through colored regions of the other color wheel as that wheel rotates. If the two color wheels have differently sized white regions, then by rotating the color wheel with the smaller white region may be used to produce a higher chroma gamut. The reverse condition in which the color wheel with the larger white region is rotated, may then produce a comparatively higher brightness gamut.

The color wheels may include indicia along their perimeters, such as on a face or edge to accommodate accurate positioning of the color wheels. Any other indicia or rotational position sensing configuration may be provided to permit operation of the color wheels as described.

Figure 21:
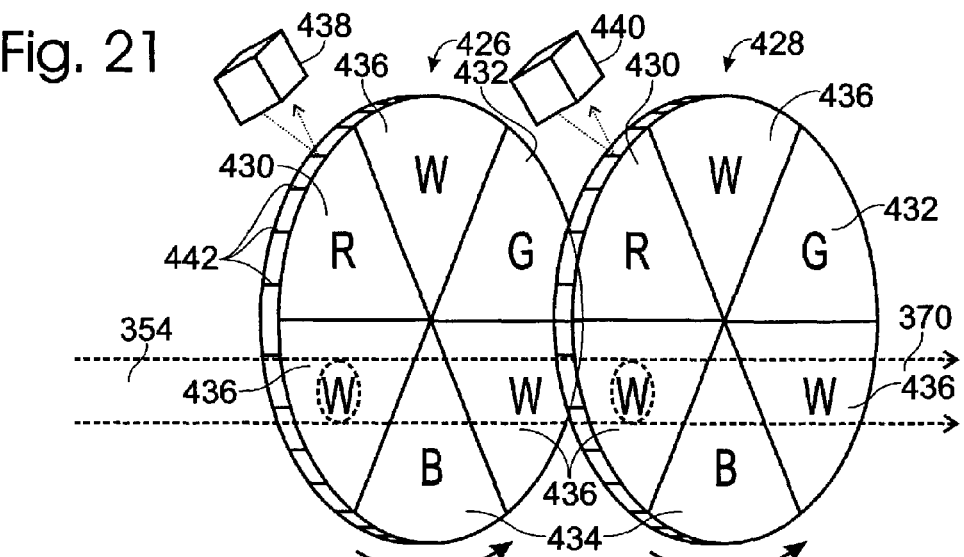
FIG. 21 is an isometric view of a dynamic gamut color wheel pair configured to display high brightness images.
Figure 22:
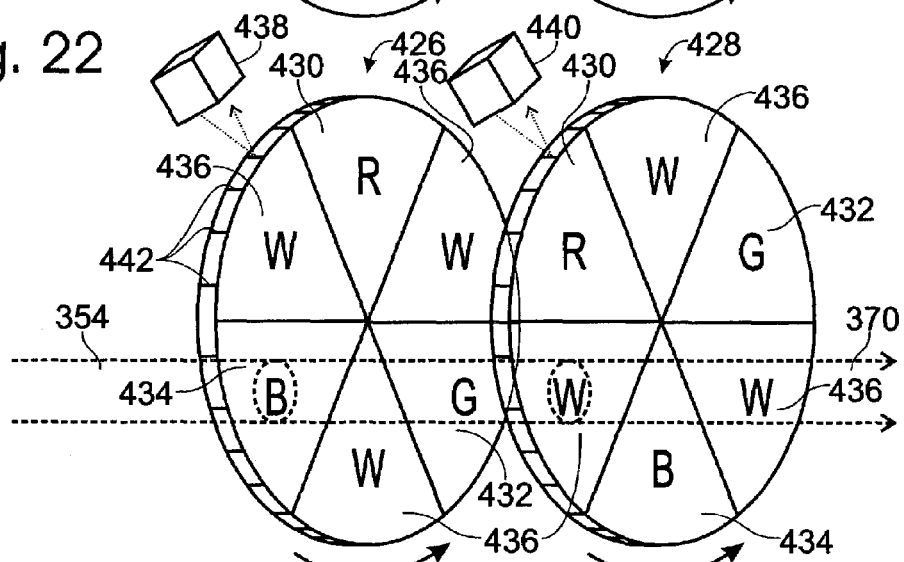
FIG. 22 is an isometric view of the color wheel pair of FIG. 21, but configured to display high chroma images.
Figure 23:
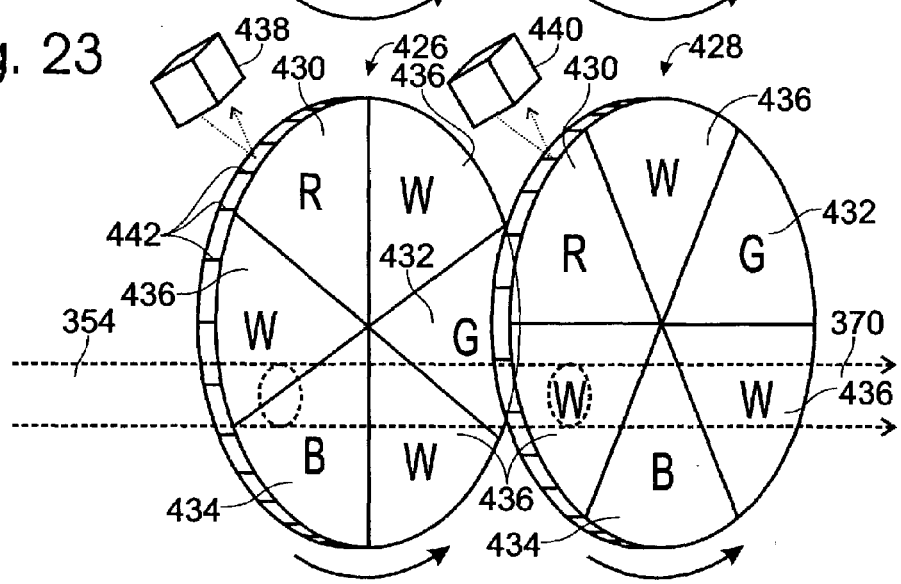
FIG. 23 is an isometric view of the color wheel pair of FIG. 21, but configured to display images with a gamut intermediate the gamuts of FIGS. 21 and 22.

Referring specifically to FIGS. 21-23, an alternative configuration of color wheels is depicted as color wheels 426 and 428. As is shown in FIG. 21, color wheels 426 and 428 are similar, typically including six color regions of approximately equivalent size. A color wheel thus includes a red region 430, a green region 432, a blue region 434 and three white regions 436.

As indicated in FIG. 21, white regions 436 of color wheels 426 and 428 may be angularly aligned using sensors 438 and 440, respectively, along with indicia 442. Once the desired angular relationship is achieved, the color wheels may be fixed relative to one another, and then rotated together to collectively define a sequential color filter. In this configuration, a relatively high-brightness gamut may be produced, as compared even to the high-brightness gamut produced with color wheel 384 as illustrated in FIG. 17. A higher brightness (white point) may be achieved with the configuration illustrated in FIG. 21, because approximately one-half of the surface area of aligned color wheels 426 and 428 is white, as compared with one-quarter of the surface area of color wheel 384. This may compensate for the reduced luminance of the colors, since the light must pass through two colored filter segments.

In FIG. 22, white regions 436 of color wheel 428 are aligned respectively with red region 430, green region 432 and blue region 434 of color wheel 426. The converse is also true. Again, sensors 438 and 440 may determine the angular orientation of color wheels 426 and 428, respectively. The color wheels may then be angularly locked relative to one another, and rotated together. In this configuration, the color wheels collectively define a sequential color filter configured to produce a high-chroma gamut. Such a gamut may be comparable to the high-chroma gamut produced with color wheel 368, as no white or color regions remain unaligned with a corresponding red, green or blue color regions on the other color wheel. The resulting produced color sequence is red-green-blue.

These color wheels may also be aligned so that the same color is not produced consecutively by the two color wheels. For instance if color wheel 428, as viewed, is rotated counter-clockwise 120 degrees, the colored light will have the sequence blue-green-red-blue-green-red. Such sequence may have reduced sequential color artifacts due to the increased frequency of the different colors.

FIG. 23 depicts color wheels 426 and 428 in an alignment intermediate to the configurations depicted in FIGS. 21 and 22. In this regard, white regions 436 of one color wheel are oriented so as to only partially overlap with the white regions of the other color wheel. It will be appreciated that the amount of overlap may be varied, which may allow a large number of gamuts with a wide range of chroma and brightness characteristics to be produced. As was previously discussed, sensors 438 and 440 may be used to establish a desired angular relationship between the color wheels for producing a desired gamut. Such a configuration may allow for small modifications in chroma or brightness based on image content, ambient light or a variety of other factors.

Figure 24:
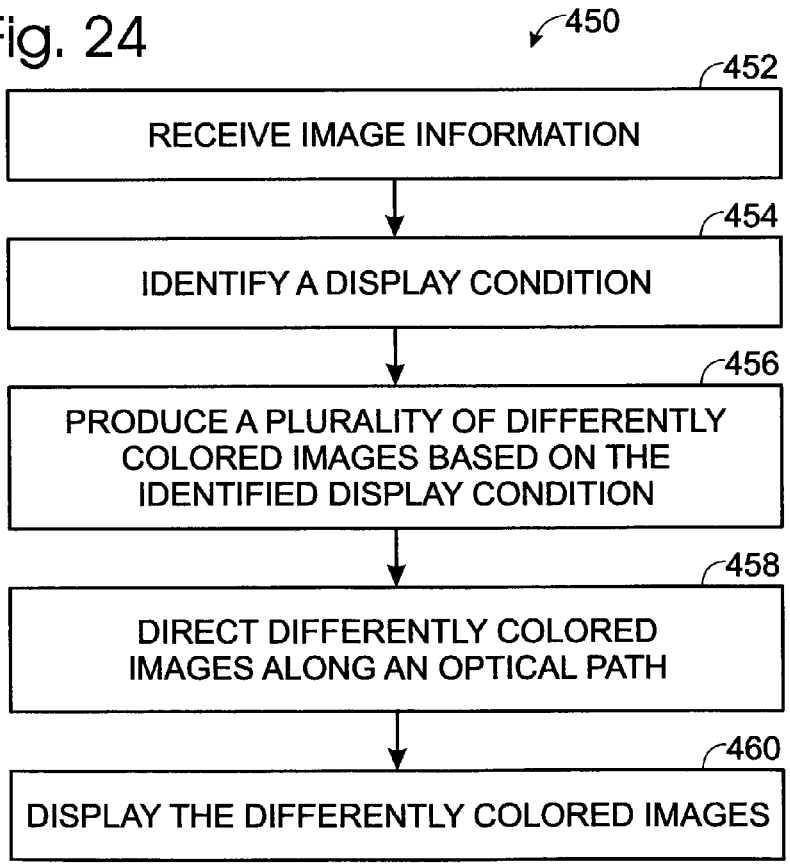
FIG. 24 is a flowchart showing a method of displaying an image.

Referring now to FIG. 24, a flowchart illustrating a method for displaying an image is indicated generally at 450. As is shown in FIG. 24, method 450 may include receiving image information at 452. A display condition, such as image content, display appearance, a gamut selection or an ambient light condition, may be identified at 454. A plurality of differently colored images based on the identified display condition then may be produced at 456. The differently colored images may be directed along an optical path at 458. The differently colored images may then be displayed at 460. Such a method may use any of the foregoing described approaches, however, the method is not limited to these approaches, as other techniques are possible.

While the present disclosure has been provided with reference to the foregoing embodiments, those skilled in the art will understand that many variations may be made therein without departing from the spirit and scope of the following claims. The description should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A display system comprising:
an identifier configured to identify an image display condition associated with the displaying of an image produced by the display system, wherein the identifier includes a pre-display image-content analyzer;
apparatus configured to modify image information based on at least one color correction factor and produce a plurality of differently colored images having color characteristics based on the modified image information and the identified display condition, with differently colored images directed along associated portions of an optical path, wherein the color correction factor comprises one of a color matrix, an exponential relationship, and a look-up table, and wherein the color correction factor is selected based on the identified display condition; and
a display device coupled to the apparatus and configured to display a color image formed of the differently colored images, wherein the color characteristics in the displayed color image are perceivable by human vision.

2. The display system of claim 1, wherein the apparatus includes a source of differently colored light and is configured to apply different levels of energy to the light source during the production of differently colored light based on the identified display condition.

3. The display system of claim 1, wherein the apparatus further includes a color filter that, when in the optical path, changes a color characteristic of the displayed color image, the apparatus being configured to be selectively operable between a first filter state in which the optical path impinges the filter and a second filter state in which the optical path does not impinge the filter, the apparatus being further configured to change the filter state in response to the identified display condition.

4. The display system of claim 1, wherein the apparatus further includes a source of differently colored lights and at least one light modulator, the at least one light modulator being configured to modulate the differently colored lights to form differently colored images based on the identified display condition.

5. The display system of claim 1, wherein the apparatus further includes a light source configured to direct light along the optical path; a sequential color producer disposed in the optical path and configured to produce, selectively, light of sequentially different colors, with different colors directed along the associated portions of the optical path; and a spatial light modulator for modulating the light of different colors according to the received image information, and wherein the apparatus is further configured to produce the sequential different colors based on the identified display condition.

6. The display system of claim 5, wherein the color producer includes first and second color wheels having differently colored filter regions that, when rotated successively through the optical path, produce the sequentially different colors, and wherein the apparatus is configured to operate selectively at least one of the first and second color wheels based on the identified display condition.

7. The display system of claim 6, wherein the first color wheel is configured to be selectively operable between a first color-wheel state in which the optical path impinges the first color wheel and a second color-wheel state in which the optical path does not impinge the first color-wheel, and wherein the apparatus is further configured to change the color-wheel state in response to the identified display condition.

8. The display system of claim 7, wherein the second color wheel is in a fixed position in the optical path.

9. The display system of claim 7, wherein the optical path does not impinge the second color wheel when the first color wheel is in the first color-wheel state and the optical path does impinge the second color wheel when the first color wheel is in the second color-wheel state.

10. The display system of claim 6 operable in a state in which the first and second color wheels are positioned in the optical path with one color wheel in a selectable orientation relative to the other color wheel.

11. The display system of claim 10, wherein the colored filter regions of the first and second color wheels include, in circumferential sequential order, a red region, a white region, a green region,. a white region, a blue region, and a white region.

12. The display system of claim 11, further operable in a state in which the red, green and blue regions of each color wheel are each axially aligned, during rotation, with a corresponding white region of the other color wheel.

13. The display system of claim 12 further operable in a first state in which color regions of the first and second color wheels having the same color pass through the optical path sequentially, and in a second state in which only color regions of the first and second color wheels having different colors pass through the optical path sequentially.

14. The display system of claim 1, wherein the pre-display image content analyzer is configured to identify at least one of an image-source type, a number of unique colors in the image information prior to display, a frequency of unique colors in the image information prior to display, an average pixel intensity in the image information prior to display, and a frame-to-frame image-content change in the image information prior to display.

15. The display system of claim 14 wherein the image-content analyzer is configured to identify an image-source type that is at least one of graphics, video, still photos, broadcast television and video games.

16. An image projector comprising:
an identifier configured to identify an image display condition associated with the displaying of an image produced by the image projector, wherein the identifier includes a pre-display image-content analyzer;
apparatus configured to modify image information based on at least one color correction factor and produce a plurality of differently colored images having color characteristics based on the modified image information and the identified display condition, with differently colored images directed along associated portions of an optical path, wherein the color correction factor comprises one of a color matrix, an exponential relationship, and a look-up table, and wherein the color correction factor is selected based on the identified display condition; and
a display device coupled to the apparatus and configured to project the produced differently colored images along the optical path to produce, when displayed, a color image formed of the differently colored images, wherein the color characteristics in the displayed color image are perceivable by human vision.

17. The projector of claim 16, wherein the apparatus includes a source of differently colored light and is configured to apply different levels of energy to the source during the production of differently colored lights based on the identified display condition.

18. The projector of claim 16, wherein the apparatus includes a color filter that, when in the optical path, changes a color characteristic of the displayed color image, the apparatus being configured to be selectively operable between a first filter state in which the optical path impinges the filter and a second filter state in which the optical path does not impinge the filter, the apparatus being further configured to change the filter state in response to the identified display condition.

19. The projector of claim 16, wherein the apparatus includes a source of differently colored lights and at least one light modulator, the at least one light modulator configured to modulate the differently colored lights to form differently colored images based on the identified display condition.

20. The projector of claim 16, wherein the apparatus includes a light source configured to direct light along the optical path; a sequential color producer disposed in the optical path and configured to produce, selectively, light of sequentially different colors, with different colors directed along the associated portion of the optical path; and a spatial light modulator for modulating the light of different colors according to the received image information, the apparatus being further configured to produce the sequential different colors based on the identified display condition.

21. The projector of claim 20, wherein the color producer includes first and second color wheels having differently colored filter regions that, when rotated successively through the optical path, produce the sequentially different colors, the apparatus being further configured to operate selectively at least one of the first and second color wheels based on the identified display condition.

22. The projector of claim 21, wherein the first color wheel is configured to be selectively operable between a first color-wheel state in which the optical path impinges the first color wheel and a second color-wheel state in which the optical path does not impinge the first color-wheel, and wherein the apparatus is further configured to change the color-wheel state in response to the identified display condition.

23. The projector of claim 22, wherein the second color wheel is in a fixed position in the optical path.

24. The projector of claim 22, wherein the optical path does not impinge the second color wheel when the first color wheel is in the first color-wheel state and the optical path does impinge the second color wheel when the first color wheel is in the second color-wheel state.

25. The projector of claim 16, wherein the pre-display image content analyzer is configured to identify at least one of an image-source type, a number of unique colors in the image information prior to display, a frequency of unique colors in the image information prior to display, an average pixel intensity in the image information prior to display, and a frame-to-frame image-content change in the image information prior to display.

26. The projector of claim 25 wherein the image-content analyzer is configured to identify an image-source type that is at least one of graphics, video, still photos, broadcast television and video games.

27. A method of producing a displayed image comprising:
receiving image information representing an image to be displayed;

identifying a display condition associated with displaying of an image produced from the received image information, wherein identifying includes analyzing the image information to determine one or more image attributes prior to display;

modifying the image information based on at least one color correction factor, wherein the color correction factor comprises one of a color matrix, an exponential relationship, and a look-up table, and wherein the color correction factor is selected based on the identified display condition;

producing, a plurality of differently colored images representative of a composite image having color characteristics based on the modified image information and the identified display condition, in which producing includes directing light along an optical path;

directing differently colored images along associated portions of the optical path; and displaying the differently colored images, wherein the color characteristics in the displayed colored images are perceivable by human vision.

28. The method of claim 27, wherein producing includes producing white light, and varying the amount of white light produced based on the identified display condition.

29. The method of claim 27, wherein producing includes one or more of:

producing differently colored light with a light source and applying different levels of energy to the light source during the producing of differently colored light based on the identified display condition;

selectively operating in a first filter state in which the optical path impinges a filter that when in the optical path changes a color characteristic of the displayed color image, and a second filter state in which the optical path does not impinge the filter, and changing the filter state in response to the identified display condition;

producing differently colored lights and modulating the differently colored lights to form differently colored images based on the identified display condition; and producing, selectively, light of sequentially different colors based on the identified display condition, with different colors directed along associated portions of the optical path, and modulating the light of different colors according to the received image information.

30. The method of claim 29, wherein producing differently colored images includes producing light of sequentially different colors, and wherein producing light of sequentially different colors includes selectively rotating at least one of first and second color wheels having differently colored filter regions successively through the optical path, based on the identified display condition.

31. The method of claim 30, wherein selectively rotating includes selectively operating in a first color-wheel state in which the optical path impinges colored filter regions of the first color wheel and in a second color-wheel state in which the optical path does not impinge colored filter regions of the first color-wheel, and changing the color-wheel state in response to the identified display condition.

32. The method of claim 31, wherein selectively rotating includes directing light through the second color wheel when the first color wheel is in the first and second color-wheel states.

33. The method of claim 31, wherein selectively rotating operating such that the optical path does not impinge colored filter regions of the second color wheel when the first color wheel is in the first color-wheel state and the optical path does impinge colored filter regions of the second color wheel when the first color wheel is in the second color-wheel state.

34. The method of claim 27, wherein analyzing the image information includes identifying at least one of a number of unique colors in the image information prior to display, a frequency of a unique color, an average pixel intensity in the image information prior to display, a frame-to-frame image content change in the image information prior to display, and an image source type.

35. An article comprising:
a storage medium having a plurality of machine-readable instructions, wherein, when the instructions are executed, the instructions provide for:
receiving image information associated with an image to be displayed;
identifying an image display condition associated with displaying of an image produced from the received image information, wherein the instructions providing for identifying an image display condition further provide for analyzing the image information to determine one or more pre-display image attributes;
modifying the image information based on at least one color correction factor, wherein the color correction factor comprises one of a color matrix, an exponential relationship, and a look-up table, and wherein the color correction factor Is selected based on the identified display condition;
producing a plurality of differently colored images representative of a composite image, and having color characteristics based on the modified image information and the identified display condition;
directing differently colored images along associated portions of an optical path; and
displaying the differently colored images, wherein the color characteristics in the displayed color images are perceivable by human vision.

36. The article of claim 35, wherein the instructions providing for producing a plurality of differentially colored images further provide for one or more of:
producing differently colored light with a light source and applying different levels of energy to the light source, during the producing differently colored light, based on the identified display condition;
selectively operating in a first filter state in which the optical path impinges a filter that when in the optical path changes a color characteristic of the displayed color image, and a second filter state in which the optical path does not impinge the filter, and changing the filter state in response to the identified display condition;
producing differently colored lights and modulating the differently colored lights to form differently colored images based on the identified display condition; and
producing, selectively, light of sequentially different colors based on the identified display condition, with different colors directed along associated portions of the optical path, and modulating the light of different colors according to the received image information.

37. The article of claim 36, wherein the instructions providing for producing light of sequentially different colors includes selectively rotating at least one of first and second color wheels having differently colored filter regions successively through the optical path, based on the identified display condition.

38. The article of claim 37, wherein the instructions providing for selectively rotating at least one of first and second color wheels further provide for selectively operating in a first color-wheel state in which the optical path impinges colored filter regions of the first color wheel and in a second color-wheel state in which the optical path does not impinge colored filter regions of the first color-wheel, and changing the color-wheel state in response to the identified display condition.

39. The article of claim 38, wherein the instructions providing for selectively rotating at least one of first and second color wheels further provide for directing light through the second color wheel when the first color wheel is in the first and second color-wheel states.

40. The article of claim 38, wherein the instructions providing for selectively rotating at least one of first and second color wheels further provide for operating such that the optical path does not impinge colored filter regions of the second color wheel when the first color wheel is in the first color-wheel state and the optical path does impinge colored filter regions of the second color wheel when the first color wheel is in the second color-wheel state.

41. The article of claim 35, wherein the instructions providing for analyzing the image information further provide for determining at least one of a number of unique colors in the pre-display image information, a spatial frequency analysis of the unique colors in the pre-display image information, average pixel intensity in the pre-display image information, frame to frame image content change in the pre-display image information, and image source type.

42. The article of claim 41, wherein the instructions providing for producing a plurality of differentially colored images further provide for varying an amount of white light generated.

43. An image display system comprising:
means for identifying an image display condition associated with the displaying of an image produced from received image information, wherein the means for identifying is further for analyzing the image information to determine one or more pre-display image attributes;
means for modifying the image information based on at least one color correction factor, wherein the color correction factor comprises one of a color matrix, an exponential relationship, and a look-up table, and wherein the color correction factor is selected based on the identified display condition; and
means for producing a plurality of differently colored images having color characteristics based on the modified image information and the identified display condition, and directing differently colored images along associated portions of an optical path for displaying the differently colored images, wherein the color characteristics in the displayed colored image are perceivable by human vision.

44. The system of claim 43, wherein the means for producing is further for producing white light, and varying the amount of white light produced based on the identified display condition.

45. The system of claim 43, wherein the means for producing a plurality of differently colored images is further for one or more of:
producing differently colored light with a light source and applying different levels of energy to the light source during the producing of differently colored light based on the identified display condition;
selectively operating in a first filter state in which the optical path impinges a filter that when in the optical path changes a color characteristic of the displayed color image, and a second filter state in which the optical path does not impinge the filter, and changing the filter state in response to the identified display condition;

producing differently colored lights and modulating the differently colored lights to form differently colored images based on the identified display condition; and producing selectively light of sequentially different colors based on the identified display condition, with different colors directed along associated portions of the optical path, and modulating the light of different colors according to the received image information.

46. The system of claim 45, wherein the means for producing differently colored images is further for producing light of sequentially different colors by selectively rotating at least one of first and second color wheels having differently colored filter regions successively through the optical path, based on the identified display condition.

47. The system of claim 46, wherein the means for producing differently colored images is further for selectively operating the first color wheel in a first color-wheel state in which the optical path impinges colored filter regions of the first color wheel and in a second color-wheel state in which the optical path does not impinges colored filter regions of the first color-wheel, and changing the color-wheel state in response to the identified display condition.

48. The system of claim 47, wherein the means for producing differently colored images directs light through the second color wheel when the first color wheel is in the first and second color-wheel states.

49. The system of claim 47, wherein the means for producing differently colored images further includes operating the second color wheel such that the optical path does not impinge colored filter regions of the second color wheel when the first color wheel is in the first color-wheel state and the optical path does impinge colored filter regions of the second color wheel when the first color wheel is in the second color-Wheel state.

50. The system of claim 43, wherein pre-display image attributes include at least one of a number of unique colors in the pre-display image information, a frequency of a unique color in the pre-display image information, an average pixel intensity in the pre-display image information, a frame-to-frame image content change in the pre-display image information, and an image source type.

51. An image projector comprising:
means for identifying an image display condition associated with the displaying of an image by the image projector, wherein the means for identifying is further for analyzing the content of an image prior to display of the image, wherein the identified display condition is a pre-display image-content attribute, the identifying means is further for identifying one or more pre-display image-content attributes, and for providing an indication of the one or more pre-display image-content attributes to the means for producing,
means for modifying image information based on at least one color correction factor, wherein the color correction factor comprises one of a color matrix, an exponential relationship, and a look-up table, and wherein the color correction factor is selected based on the identified display condition;
means for producing a plurality of differently colored images having color characteristics based on the modified image information and the identified display condition, with differently colored images directed along associated portions of an optical path; and
means coupled to the means for producing for projecting the produced differently colored images along the optical path to produce, when displayed, a color image formed of the differently colored images, wherein the color characteristics in the displayed color image are perceivable by human vision.

52. The projector of claim 51, wherein the means for producing a plurality of differently colored images is further for one or more of:
producing differently colored light with a light source and applying different levels of energy to the light source during the producing of differently colored light based on the identified display condition;
selectively operating in a first filter state in which the optical path impinges a filter that when in the optical path changes a color characteristic of the displayed color image, and a second filter state in which the optical path does not impinge the filter, and changing the filter state in response to the identified display condition;
producing differently colored lights and modulating the differently colored lights to form differently colored images based on the identified display condition; and
producing selectively light of sequentially different colors based on the identified display condition, with different colors directed along associated portions of the optical path, and modulating the light of different colors according to the received image information.

53. The projector of claim 52, wherein the means for producing differently colored images is further for producing light of sequentially different colors by selectively rotating at least one of first and second color wheels having differently colored filter regions successively through the optical path, based on the identified display condition.

54. The projector of claim 53, wherein the means for producing differently colored images is further for selectively operating the first color wheel in a first color-wheel state in which the optical path impinges colored filter regions of the first color wheel and in a second color-wheel state in which the optical path does not impinges colored filter regions of the first color-wheel, and changing the color-wheel state in response to the identified display condition.

55. The projector of claim 54, wherein the means for producing differently colored images directs light through the second color wheel when the first color wheel is in the first and second color-wheel states.

56. The projector of claim 54, wherein the means for producing differently colored images further includes operating the second color wheel such that the optical path does not impinge colored filter regions of the second color wheel when the first color wheel is in the first color-wheel state and the optical path does impinge colored filter regions of the second color wheel when the first color wheel is in the second color-wheel state.

57. The image projector of claim 51, wherein pre-display image attributes include at least one of a number of unique colors in the pre-display image information, a frequency of a unique color in the pre-display image information, an average pixel intensity in the pre-display image information, a frame-to-frame image content change in the pre-display image information, and an image source type.

* * * * *

UNITED STATES PATENT AND TRADEMARK OFFICE
CERTIFICATE OF CORRECTION

PATENT NO. : 7,460,179 B2 Page 1 of 1
APPLICATION NO. : 10/388688
DATED : December 2, 2008
INVENTOR(S) : Michael A Pate et al.

It is certified that error appears in the above-identified patent and that said Letters Patent is hereby corrected as shown below:

In column 18, line 23, in Claim 11, delete "region,." and insert -- region, --, therefor.

In column 18, line 44, in Claim 15, after "claim 14" insert -- , --.

In column 19, line 61, in Claim 26, after "claim 25" insert -- , --.

In column 20, line 12, in Claim 27, after "producing" delete ",".

In column 21, line 26, in Claim 35, delete "Is" and insert -- is --, therefor.

In column 23, lines 33-34, in Claim 49, delete "color-Wheel" and insert -- color-wheel --, therefor.

In column 23, line 52, in Claim 51, delete "producing," and insert -- producing; --, therefor.

Signed and Sealed this

Seventh Day of April, 2009

JOHN DOLL
*Acting Director of the United States Patent and Trademark Office*